US012354424B2

(12) United States Patent
Elrad et al.

(10) Patent No.: US 12,354,424 B2
(45) Date of Patent: *Jul. 8, 2025

(54) TECHNIQUES FOR AUTHENTICATING BUILDING/ROOM ACCESS TERMINALS

(71) Applicant: APPLE INC., Cupertino, CA (US)

(72) Inventors: Oren M. Elrad, San Francisco, CA (US); Florian Galdo, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,052

(22) Filed: Aug. 31, 2023

(65) Prior Publication Data
US 2024/0062602 A1 Feb. 22, 2024

Related U.S. Application Data

(63) Continuation of application No. 17/500,394, filed on Oct. 13, 2021, now Pat. No. 11,783,654.
(Continued)

(51) Int. Cl.
*G07C 9/00* (2020.01)
*H04B 5/00* (2024.01)
(Continued)

(52) U.S. Cl.
CPC ........... *G07C 9/00896* (2013.01); *H04B 5/77* (2024.01); *H04L 9/3073* (2013.01);
(Continued)

(58) Field of Classification Search
CPC . G07C 9/00896; G07C 9/00174; H04W 4/33; H04W 12/068; H04W 12/041; H04B 5/0056; H04L 9/3073; H04L 9/3247
See application file for complete search history.

(56) References Cited

U.S. PATENT DOCUMENTS

| 8,948,386 B2* | 2/2015 | Campagna | H04L 9/0844 380/247 |
| 10,574,466 B1* | 2/2020 | Gopalakrishnan | H04L 9/3242 |

(Continued)

FOREIGN PATENT DOCUMENTS

EP 4134925 A1 2/2023

OTHER PUBLICATIONS

Notice of Allowance issued in U.S. Appl. No. 17/500,394, dated Jun. 2, 2023 in 17 pages.

*Primary Examiner* — Yong Hang Jiang
(74) *Attorney, Agent, or Firm* — Kilpatrick Townsend & Stockton LLP

(57) ABSTRACT

The techniques described herein provide for authentication of a reader device over a wireless protocol (e.g., NFC or Bluetooth, BLE). The mobile device can receive and store the static public key of the reader device and one or more credentials, each credential specifying access to an electronic lock. The mobile device can receive an ephemeral reader public key, a reader identifier, and a transaction identifier. The mobile device can generate session key using the ephemeral mobile private key and the ephemeral reader public key and send the ephemeral mobile public key to the reader device. The reader device can receive the ephemeral mobile public key and sign and transmit a signature message to the mobile device. The mobile device can validate a reader signature and generate an encrypted credential that the reader can use to access an electronic lock. The reader device can authenticate the mobile device for mutual authentication.

20 Claims, 9 Drawing Sheets

Related U.S. Application Data

(60) Provisional application No. 63/197,438, filed on Jun. 6, 2021.

(51) Int. Cl.

| | | |
|---|---|---|
| *H04B 5/77* | (2024.01) | |
| *H04L 9/30* | (2006.01) | |
| *H04L 9/32* | (2006.01) | |
| *H04W 4/33* | (2018.01) | |
| *H04W 12/041* | (2021.01) | |
| *H04W 12/06* | (2021.01) | |

(52) U.S. Cl.
CPC ............. *H04L 9/3247* (2013.01); *H04W 4/33* (2018.02); *H04W 12/041* (2021.01); *H04W 12/068* (2021.01); *H04L 2209/80* (2013.01)

(56) References Cited

U.S. PATENT DOCUMENTS

| | | |
|---|---|---|
| 10,574,633 B2 | 2/2020 | Le Saint et al. |
| 2004/0049675 A1* | 3/2004 | Micali ................... G07F 7/1016 |
| | | 713/158 |
| 2007/0168674 A1* | 7/2007 | Nonaka ................. G07F 7/1008 |
| | | 713/168 |
| 2011/0084799 A1* | 4/2011 | Ficko ....................... G07C 9/27 |
| | | 340/5.65 |
| 2014/0079217 A1 | 3/2014 | Bai et al. |
| 2018/0167208 A1 | 6/2018 | Le Saint et al. |
| 2020/0052905 A1 | 2/2020 | Mathias et al. |
| 2020/0058004 A1* | 2/2020 | Ruggirello ........... G06Q 20/385 |
| 2020/0100108 A1 | 3/2020 | Everson et al. |
| 2020/0186367 A1 | 6/2020 | Yang et al. |
| 2020/0259650 A1* | 8/2020 | Montemurro ........... H04L 9/321 |
| 2021/0184842 A1* | 6/2021 | Nix ............................ H04L 9/14 |
| 2022/0337582 A1* | 10/2022 | Jogand-Coulomb ....................... |
| | | G06F 21/606 |

* cited by examiner

TECHNIQUES FOR AUTHENTICATING BUILDING/ROOM ACCESS TERMINALS

CROSS-REFERENCES TO RELATED APPLICATIONS

This application is a continuation of and claims the benefit of U.S. Non-Provisional patent application Ser. No. 17/500,394, filed Oct. 13, 2021, that claims the benefit of priority to U.S. Provisional Application No. 63/197,438, filed Jun. 6, 2021, entitled "Techniques For Authenticating Building/Room Access Terminals," the disclosures which is incorporated by reference in its entirety and for all purposes.

BACKGROUND

In a digital access system, a user may provide a digital access information to wireless terminal devices of third parties, such as a wireless terminal device of a building or a room within a building (e.g., hotel room, conference room, gym, lab, etc.). Although the third party may be able to authenticate a user upon receiving the user's digital access information, the user may be unable to verify the third party associated with the wireless terminal device prior to providing/releasing their digital access information. In addition, the user may be unable to verify that the third party is authorized to receive the user's digital access information. For example, the user may be unable to verify that a given wireless terminal device is associated with a commercial entity, such as a hotel (which may be authorized to receive the user's digital access information) or is a personal device of a hotel employee (who may not be authorized to receive the user's digital access information). Rogue readers or malicious terminal readers exist that can mimic a legitimate business' reader in order to gain access to personal information and even enable a person to use this information to gain access to user's physical security (e.g., a fake door card using personal information).

BRIEF SUMMARY

The techniques provide for authentication of a reader device by a mobile device using a wireless protocol (e.g., Near Field Communications (NFC) or Bluetooth, Bluetooth Low Energy (BLE)). The authentication of the reader can be implemented using static reader public key that was previously provisioned to the mobile device from a provisioning device. Once a mobile device authenticates a reader, the mobile device can provide a credential to gain access to an area, where the credential can also be obtained from the provisioning device.

The mobile device can receive and store the static public key of the reader device. The mobile device can also receive and store one or more access credentials to access a part of a building. The static public key of the reader device and/or the one or more access credentials can be received from a provisioning device. The mobile device can detect a beacon signal indicating a wireless protocol used to initiate an authentication procedure. The mobile device can receive a message over the wireless protocol. The message can include an ephemeral reader public key, a reader identifier, and a transaction identifier. The mobile device can generate session key using the ephemeral mobile private key and the ephemeral reader public key. The mobile device can send the ephemeral mode public key to the reader device. The mobile device can receive a reader signature that was generating by signing, using a static reader private key, a signature message. The signature message can include the ephemeral mobile public key, the reader identifier, and the transaction identifier. The mobile device can verify the reader signature using the static reader public key, and values for the ephemeral reader public key, the reader identifier, and the transaction identifier. The mobile device can send an encrypted credential to the reader device. The encrypted credential can be generated by encrypting a credential of the one or more access credentials using the session key. The mobile device can display an indication that the authentication process is complete.

These and other embodiments of the invention are described in detail below. For example, other embodiments are directed to systems, devices, and computer readable media associated with methods described herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Like reference symbols in the various drawings indicate like elements, in accordance with certain example implementations. In addition, multiple instance of an element may be indicated by following a first number for the element with a letter or a hyphen and a second number.

DETAILED DESCRIPTION

Figure 1:
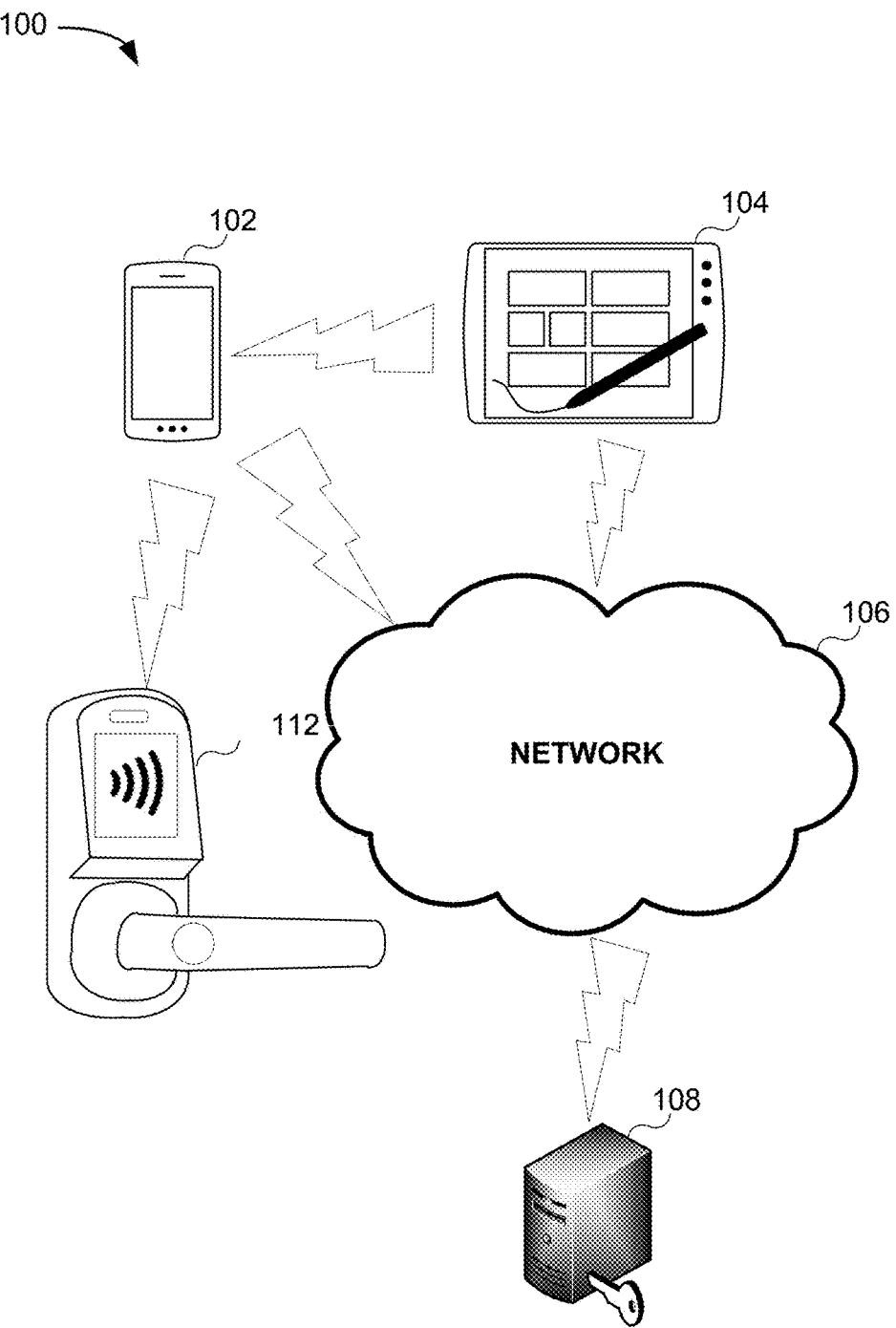
FIG. 1 illustrates an example network environment for authentication in accordance with one or more implementations.

The present disclosure describes embodiments in which a mobile device can used to gain access to various electronic locks or systems. In some embodiments, asymmetric cryptography is used to establish a secure channel between a mobile device and a reader device for an electronic lock. The mobile device can receive a static reader public key and a credential either via a provisioning device, via a network connection, or via an electronic message. The static reader public key can be common to multiple reader devices. The credential can specify specific access to a part of a facility (e.g., a hotel room, a fitness center, a parking garage, etc.)

The mobile device can receive a message from the reader device that include the ephemeral reader public key, a reader identifier, and a transaction identifier. The mobile device can generate an ephemeral key pair that includes an ephemeral mobile private key and an ephemeral mobile public key. The mobile device can generate a session key using the ephemeral mobile private key and the ephemeral reader public key. The mobile device can send a message to the reader device that includes the ephemeral mobile public key. The reader device can send a reader signature that was generated by a static reader private key, an ephemeral mobile public key, a reader identifier, and the transaction identifier. The mobile device can authenticate the reader device by verifying a signature using the certificate, the static reader public key, and values for the ephemeral reader public key, the reader identifier, and the transaction identifier. Upon verification of the signature, the mobile device can encrypt a credential and send the encrypted credential to the mobile device. The reader device can then decrypt the credential and then match against a stored credential expected for any device to gain access to the area controlled by the reader device.

I. Overview for Provisioning and Communication with Reader

The techniques provide for authentication of a reader device over a wireless protocol (e.g., NFC or Bluetooth, BLE). The mobile device can receive a static reader public key of the reader device and a credential to access a part of a facility (e.g., a building). The authentication session can begin by the mobile device detecting a beacon from the reader device. The reader device can detect the presence of the mobile device and transmit a message over a wireless protocol that includes an ephemeral public key, a reader identifier, and a transaction identifier. The mobile device can generate an ephemeral key pair that includes an ephemeral mobile private key and an ephemeral mobile public key. The mobile device can generate a session key using the ephemeral mobile private key and the ephemeral reader private key. The mobile device can validate a reader signature and generate an encrypted response message that the reader can use to authenticate the mobile device. The encrypted credential can be used to access various electronic locks.

In some embodiments, the disclosed techniques may advantageously provide privacy equivalent to physical keys, offline key sharing, interoperability across devices and systems, operation independent from the underlying radio protocol(s), scalable systems, etc. In some embodiments, mobile device private keys never leave secure circuitry (e.g., a secure element) included in the mobile device. In some embodiments, the disclosed techniques can be used over an untrusted channel and provide protection against active and/or passive eavesdroppers.

FIG. 1 illustrates an example network environment 100 for authentication of an access device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a mobile device 102, a provisioning device 104, a network 106, an access credential issuer server 108, and a reader device 112. The network 106 may communicatively (directly or indirectly) couple, for example, any two or more of the mobile device 102, the provisioning device 104, and the access credential issuer server 108.

In one or more implementations, the network 106 may be an interconnected network of devices that may include, or may be communicatively coupled to, the Internet. For explanatory purposes, the network environment 100 is illustrated in FIG. 1 as including a single mobile device 102, a single provisioning device 104, and a single access credential issuer server 108; however, the network environment 100 may include any number of electronic devices, wireless terminal devices, and servers.

The mobile device 102 may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as NFC radios, wireless local area network (WLAN) radios, Bluetooth radios, Zigbee radios, cellular radios, and/or other wireless radios. In FIG. 1, by way of example, the mobile device 102 is depicted as a smartphone. The mobile device 102 may be, and/or may include all or part of, the mobile device 102 discussed below with respect to FIG. 2, and/or the electronic system discussed below with respect to FIG. 9. In one or more implementations, the mobile device 102 may include a secure hardware component onto which applet instances, including digital access credential applet instances, may be provisioned. An example mobile device 102 that includes a secure hardware component, such as a secure element and/or a secure enclave processor, is discussed further below with respect to FIG. 2.

The provisioning device 104 may be, for example, a tablet device, a mobile device, a smartphone and/or any device that includes one or more wireless interfaces that may be used to perform a wireless transaction, such as NFC radios, wireless local area network (WLAN) radios, Bluetooth radios, Zigbee radios, cellular radios, and/or other wireless radios. The provisioning device 104 may be, and/or may include all or part of, the electronic device discussed below with respect to FIG. 2, and/or the electronic system discussed below with respect to FIG. 9.

The mobile device 102 may communicate with the provisioning device 104 via a direct communication (e.g., peer-to-peer communication), such as NFC, Bluetooth, BLE, and/or Wi-Fi Aware that bypasses the network 106. In one or more implementations, the mobile device 102 may communicate with the provisioning device 104 over the network 106 and/or the provisioning device 104 (and/or the mobile device 102) may not be communicatively coupled to the network 106.

The access credential issuer server 108 may include one or more servers that facilitate providing a digital access credential to the mobile device 102 of the user. In one or more implementations, the access credential issuer server 108 may be and/or may include a secure mobile platform. For example, the access credential issuer server 108 may include one or more trusted service manager (TSM) servers that provision/transmit scripts to secure hardware components of electronic devices, such as the mobile device 102, one or more application servers, and/or the like.

In one or more implementations, a digital access credential may include one or more data fields of user information that has been verified by the access credential issuer server 108. The digital access credential may include a public key corresponding to the mobile device 102, and may be signed with a private key corresponding to the access credential issuer server 108, as is discussed further below with respect to FIG. 3.

The certificate provisioned to a provisioning device may include information identifying the entity corresponding to the provisioning device, may include information identifying the provisioning device itself, may include a certificate type or a class/tier of the certificate (and/or of the provisioning device), and/or may include a list of data fields of the digital access credential that the provisioning device is authorized to receive. Each class/tier of certificates may be associated, e.g., on the user's device, with a particular subset of user information that the class/tier of certificates authorizes a provisioning device to receive.

Authentication may prevent unauthorized users from using mobile device 102 to grant authorization to reader device 112. Authentication may be performed at least in part by a secure element protocol that may prevent a secure element from performing further communications for authorization session until authentication is complete. In some embodiments, biometric templates may be stored in a secure circuit included in the reader device and may be configured to perform at least a portion of biometric authentication. In other embodiments, biometric authentication may be handled entirely by the mobile device 102. In other embodiments, authentication of mobile device 102 may be performed without authenticating a user of the mobile device 102, e.g., in order to allow a user to physically lend their mobile device 102 to another user for purposes of access to a room protected by the access device 112.

II. Provisioned Mobile Device

The mobile device 102 is an electronic device that may include a processor, a memory, a wireless transceiver, input/output interfaces, and an interconnect (e.g., a system bus). The mobile device 102 can be a smartphone, a tablet computer, or a wearable device (e.g., an electronic watch). As part of the provisioning, the mobile device 102 can receive the static public keys for one or more reader devices, and the static public keys can be stored in the memory of the mobile device 102. The mobile device 102 can also receive and store the reader identifier for the one or more reader devices. The mobile device 102 can cross-reference any received reader identifier with the stored reader identifiers to determine which static public key to use to authenticate the reader device.

Figure 2:
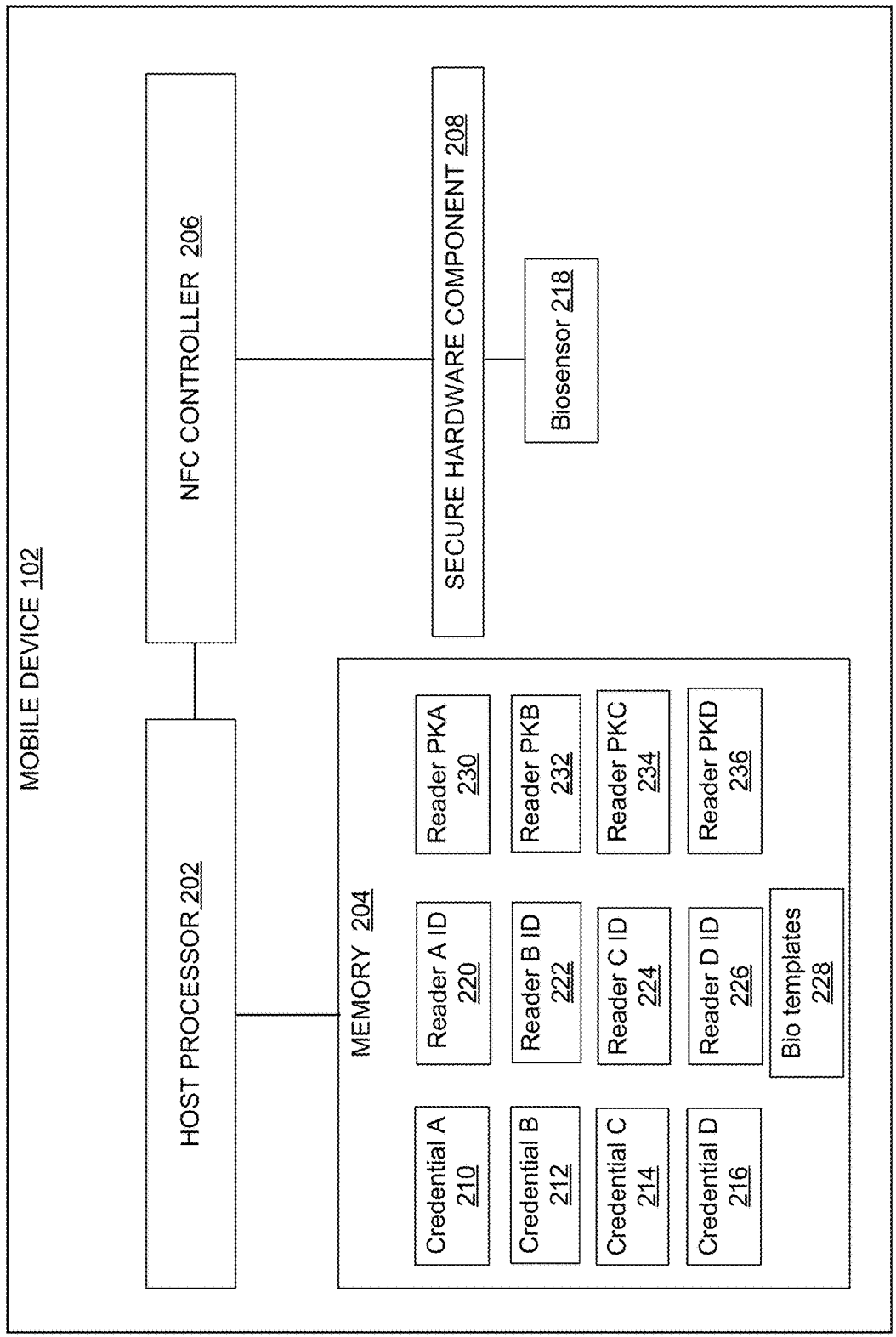
FIG. 2 illustrates an example electronic device in a wireless authentication system in accordance with one or more implementations.

FIG. 2 illustrates an example mobile device 102 in a wireless authentication system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The mobile device 102 may include a host processor 202, a memory 204, an NFC controller 206, and a secure hardware component 208, which may be, for example, a secure element and/or a secure enclave processor (SEP). The secure hardware component 208 may include one or more interfaces for communicatively coupling to the NFC controller 206 and/or the host processor 202, such as via one or more single wire protocol (SWP) connections and/or any other data connection.

The memory 204 can store one or more secure credentials (e.g., Credential A 210, Credential B 212, Credential C 214, and Credential D 216). For example, Credential A 210 can be used to access a hotel room and Credential B 212 can be used to access a fitness center. Credential C 214 can be used to access a parking garage. Credential D 216 can be used to access an elevator in the hotel. The one or more secure credentials can be specific to a specific reader or specific to a group of readers. The memory 204 can also store one or more reader identifiers (e.g., Reader A ID 220, Reader B ID 222, Reader C ID 224, and Reader D ID 226). The one or more secure credentials can be cross-referenced to one or more reader devices using the reader identifiers. The one or more secure credentials (e.g., Reader A ID 220, Reader B ID 222, Reader C ID 224, and Reader D ID 226) can be used to access different electronic locks or electronic systems. The memory 204 can also be used to store one or more biometric templates 228 as discussed above.

The memory 204 can also store a plurality of static reader public keys (e.g., Reader PKA 230, Reader PKB 232, Reader PKC 234, and Reader PKD 236). The static reader public keys can be used to validate the reader device prior to sending the credentials to obtain access. In various embodiments, each reader device can have its own static reader public key. In various embodiments, multiple devices can share the same static reader public key. In this way, a mobile device 102 provisioned for one static reader public key and associated credentials and be used for a number of electronic locks (e.g., all exterior locks for different entrances to the hotel).

In some embodiments, SEP can be configured to maintain previously captured biometric template data of one or more authorized users and compare it against newly received data captured by a biosensor 218 in order to authenticate a user. In another embodiment, biosensor 218 may perform the comparison. The SEP can be configured to store biometric data collected from fingerprints, facial biometric data (e.g., iris data, voice data, facial or body characteristics), etc. in biometric templates 228. In fingerprint embodiments, each biometric template 228 may correspond to a particular registered user and may be assigned a unique index value. In some embodiments, if biometric data received from biosensor 218 matches the biometric data stored in a biometric template 228, the secure hardware component 208 can be configured to determine the unique index value associated with the matching template to look up the corresponding identification information for a known user being authenticated. The biometric data can be used to unlock the use of the one or more credentials.

The secure hardware component 208 may include one or more provisioned applet instances, e.g., corresponding to one or more digital access credentials and/or one or more other applet instances. In one or more implementations, the operating system and/or execution environment of the secure hardware component 208 may be a JAVA-based operating system and/or JAVA-based execution environment, and the one or more applet instances may be JAVA-based applets. In other implementations, other operating systems, languages, and/or environments can be implemented. In addition to the one or more applet instances, the secure hardware component 208 may also include one or more additional applets for performing other operations, such as a security applet, a registry applet, and the like.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure hardware component 208. The NFC controller 206 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The provisioning device 104 and the reader device 112 of FIG. 1 may include similar wireless communication capabilities as the mobile device 102. For example, the provisioning device 104 and the reader device 112 may include one or more antennas and/or transceivers for communicating with the mobile device 102 via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the provisioning device 104 and the reader device 112 may include a wireless reader, such as an NFC reader.

For explanatory purposes, the mobile device 102 is described as using the NFC controller 206 to initiate communication with the reader device 112. However, the mobile device 102 may use any wireless communication protocol to communicate with the reader device 104, such as Bluetooth, Bluetooth low energy, Wi-Fi, Zigbee, millimeter wave (mm-Wave), or generally any wireless communication protocol. In one or more implementations, a communication session between the mobile device 102 and the reader device 104 may be initiated over a first wireless communication, such as NFC, and then may be handed off to a second wireless communication, such as Bluetooth, Wi-Fi Aware, or the like.

The host processor 202 may include suitable logic, circuitry, and/or code that enable processing data and/or controlling operations of the mobile device 102. In this regard, the host processor 202 may be enabled to provide control signals to various other components of the mobile device 102. The host processor 202 may also control transfers of data between various portions of the mobile device 102. Additionally, the host processor 202 may enable implementation of an operating system or otherwise execute code to manage operations of the mobile device 102. The memory 204 may include suitable logic, circuitry, and/or code that enable storage of various types of information such as received data, generated data, code, and/or configuration information. The memory 204 may include, for example, random access memory.

In one or more implementations, one or more of the host processor 202, the memory 204, the NFC controller 206, the secure hardware component 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

As used herein, the term "secure channel" refers to either a dedicated path for communicating data (i.e., a path shared by only the intended participants) or communicating encrypted data or signed data using cryptographic keys known only to the intended participants. As used herein, the term "secure circuit" refers to one of a class of circuits that is configured to perform one or more services and return an authenticated response to an external requester. A result returned by a secure circuit is considered to have indicia of trust exceeding that of a circuit that merely returns a result without any form of authentication. Thus, a circuit that provides data (e.g., from an untrusted memory region accessible to third-party applications) that does not authenticate the source of accessed data would not be considered a secure circuit within the meaning of this application. In embodiments disclosed herein, a secure element and a secure enclave processor are provided as examples of secure circuits. By authenticating results that are returned, such as by signing with a verifiable cryptographic signature, a secure circuit may thus provide anti-spoofing functionality. Similarly, by encrypting results using a private or secret key, a secure circuit may authenticate the source of the encrypted data (encryption may be used alone or in combination with signatures, in various embodiments). Additionally, in some cases, a secure circuit may be said to be "tamper-resistant," which is a term of art referring to mechanisms that prevent compromise of the portions of the secure circuit that perform the one or more services. For example, a secure mailbox may be implemented such that only a portion of the secure circuit (e.g., a pre-defined memory region) is directly accessible to other circuitry. Similarly, firmware executed by a secure circuit may be encrypted, signed, and/or stored in a region that is inaccessible to other processing elements.

The mobile device and system may include any suitable hardware to implement functionality described herein. Accordingly, this hardware may include a processor subsystem coupled to a system memory and I/O interfaces(s) or devices via an interconnect (e.g., a system bus). Although described as a mobile device, this device may be any of various types of devices, including, but not limited to, a laptop or notebook computer, tablet computer, handheld computer, a wearable device (e.g., an electronic watch) a consumer device such as a mobile phone, music player, or personal data assistant (PDA). The mobile device and/or system may also implement various functionality by executing program instructions embodied in a non-transitory computer readable medium.

III. Provisioning

The techniques of authenticating a reader device can include provisioning the mobile device with the static reader public key of the reader device. In addition, the mobile device can be provisioned with one or more credentials. The one or more credentials can specify access to one or more areas, e.g., as managed by one or more electronic locks for a facility that each managed by a reader. The mobile device can be provisioned in various ways. The mobile device can be provisioned using another mobile device (e.g., a tablet computer or smartphone) by authorized personnel in the facility. The mobile device can also receive the static reader public key via a secure network. The mobile device can also receive a link to download the static reader public key via an electronic message.

Figure 3:
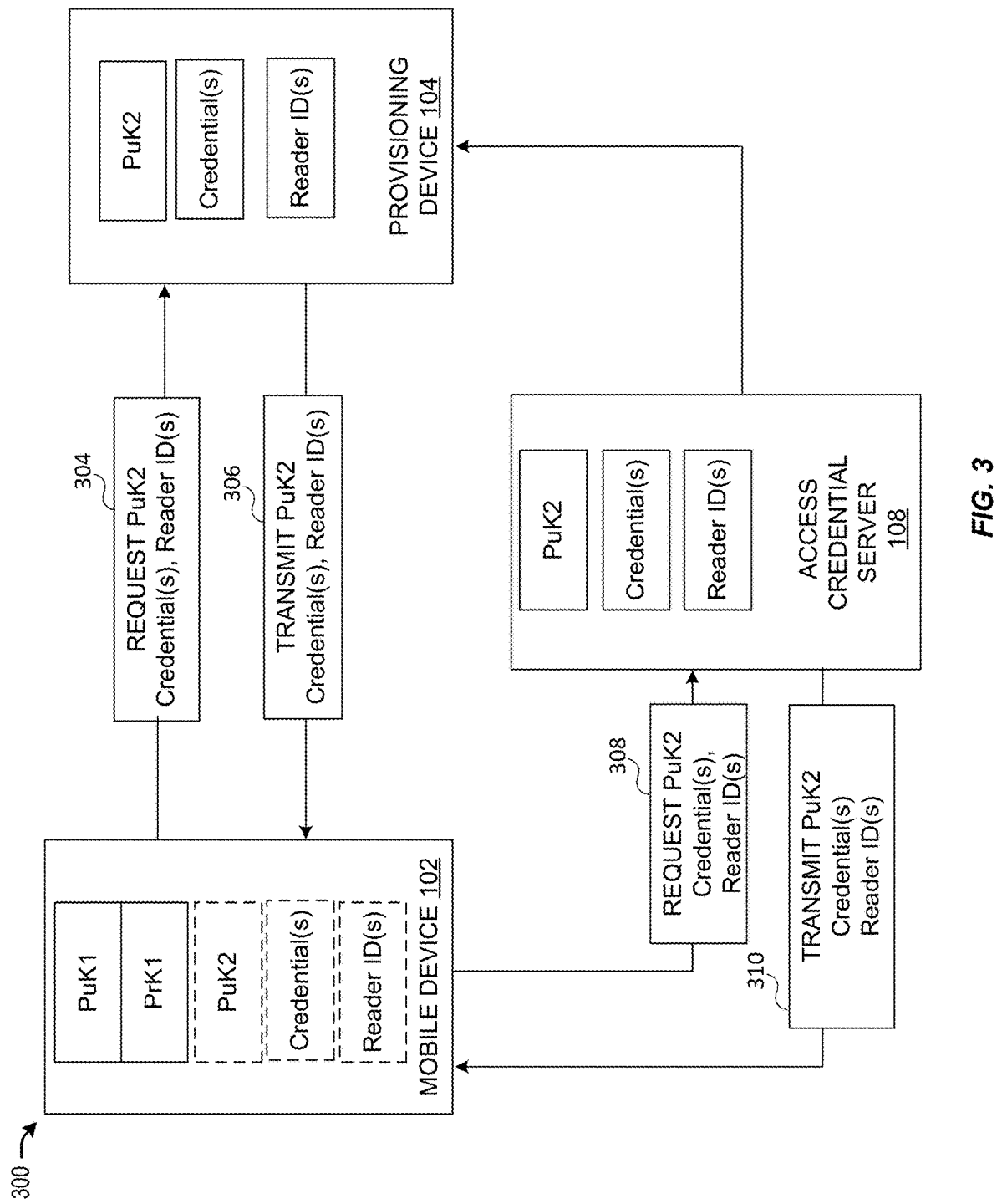
FIG. 3 illustrates an example network environment for wireless reader authentication including distribution of keys in accordance with one or more implementations.

FIG. 3 illustrates an example network environment 300 for provisioning the mobile device authentication including distribution of keys in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The example network environment 300 includes the mobile device 102, the provisioning device 104, and the access credential server 108. The mobile device 102 stores a static public/private key pair PuK1/PrK1, such as in the secure hardware component 208.

A. Provisioning Mobile Device Using Electronic Device

A mobile device can be provisioned with the static reader public key of a reader device using a provisioning device 104. The provisioning device 104 can be an electronic device (e.g. a tablet computer, a laptop computer, a smartphone, etc.). The static reader public key of the reader device (PuK2) can be stored in the memory of the provisioning device 104. The provisioning device 104 can be operated by a lobby person of the facility (e.g., a hotel). The lobby person can check the identification and reservations of the guest. In various embodiments, the lobby person can also receive payment from the guest. The lobby person can use the provisioning device 104 to send the static reader public key of the reader device and the one or more credentials to the mobile device 102.

At 304, the mobile device 102 can request the static reader public key and one or more credentials from the provisioning device. The provisioning device 104 can receive the request from the mobile device 102 for the static reader public key of the reader device and one or more credentials. The request can be communicated via an electronic message or via a wireless communication session (e.g., via NFC). The provisioning device 104 can verify that the mobile device 102 is authorized to receive the static reader public key of the reader device. The provisioning device 104 can also determine which credentials of the plurality of credentials the mobile device 102 is authorized to receive. The provisioning device 104 can interface with an access credential server 108 to verify that the mobile device 102 is authorized to receive the static reader public key and the one or more credentials. In various embodiments, the provisioning can be performed via NFC communications.

There may only a single reader public key per installation (e.g., a hotel). The credential for the mobile device can be provided by a business logic/database, e.g., operated by a property manager. Thus, there can be the same static reader public key for different reader devices. Each reader can check a list of authorized credentials or check that a credential was issued by an authorized device, e.g., an authorized provisioning device. In other examples, there are different reader IDs, and each reader ID can have a respective static reader public key. For example, there may be one credential to access a room and a different credential to access the elevator bank.

If the readers are networked, all the reader devices can have the same reader ID and can be provided the same credential for matching against a credential received from the mobile device. For example, in some hotels the exterior doors are locked after hours for security. There may be more than one exterior door to the hotel. All the electronic locks to the exterior doors can share the same static reader public key. In this way, a hotel guest can use the same credential to access any one of the exterior locks without having to get individual credentials for each of the locks.

In various embodiments, the provisioning device 104 can receive the static reader public key of the reader device, the one or more credentials, and the reader identifiers from the access credential server 108. The provisioning device 104 can store the static reader public key of the reader device, the one or more credentials, and the reader identifiers in a memory of the provisioning device 104.

At 306, following authorization of the mobile device 102, the provisioning device 104 can transmit the static reader public key of the reader device, the one or more credentials, and the reader identifier(s) from the provisioning device 104. The provisioning device 104 can transmit the static reader public key of the reader device, and the one or more credentials, and the reader identifier(s) via wired or wireless means. The static reader public key of the reader device, the one or more credentials, and the reader identifiers can be stored in a memory of the mobile device 102. The reader identifiers can be cross-referenced, by mobile device 102, with the one or more credentials to determine a matching credential for a particular reader device. This can enable the mobile device 102 to know which credential of the one or more credentials to use when a reader device is encountered.

B. Provisioning Mobile Device over Network

In some cases, the provisioning can be performed directly from the access credential server 108. The mobile device 102 may download the static reader public key, the one or more credentials, and the reader identifiers from a secure website. The access credential server 108 can send an electronic message with an embedded link to allow the mobile device 102 to access the static reader public key, the one or more credentials, and the reader identifiers. The static reader public key of the reader device (PuK2) can be stored in the memory of the access credential server 108.

At 308, the mobile device 102 can logging to a secure website that can send a request for the static reader public key of the reader device, one or more credentials, and reader identifiers. In various embodiments, the mobile device can receive an email link. The email link can direct the mobile device 102 to the server device after a user selects the link. The access credential server 108 can receive the request from the mobile device 102 for the static reader public key of the reader device, the one or more credentials, and the reader identifiers. The request can be communicated via an electronic message or over a network (e.g., the Internet). The access credential server 108 can verify that the mobile device 102 is authorized to receive the static reader public key of the reader device and which credentials of the plurality of credentials the mobile device 102 is authorized to receive. This could be done by embedding a token (e.g., JSON Web Token) into the link sent to the mobile device. The token can be transmitted from a provisioning device 104 in a facility (e.g., a hotel). When the link is used, the secret token can be transmitted to the access credential server; and based on that token, the server can provide a suitable credential to mobile device based on that token.

At 310, following authorization of the mobile device 102, the access credential server 108 can transmit the static reader public key of the reader device, the one or more credentials, and the reader identifiers from the provisioning device 104. The static reader public key of the reader device, the one or more credentials, and the reader identifiers can be stored in a memory of the mobile device 102.

IV. Authenticating the Reader

Figure 5:
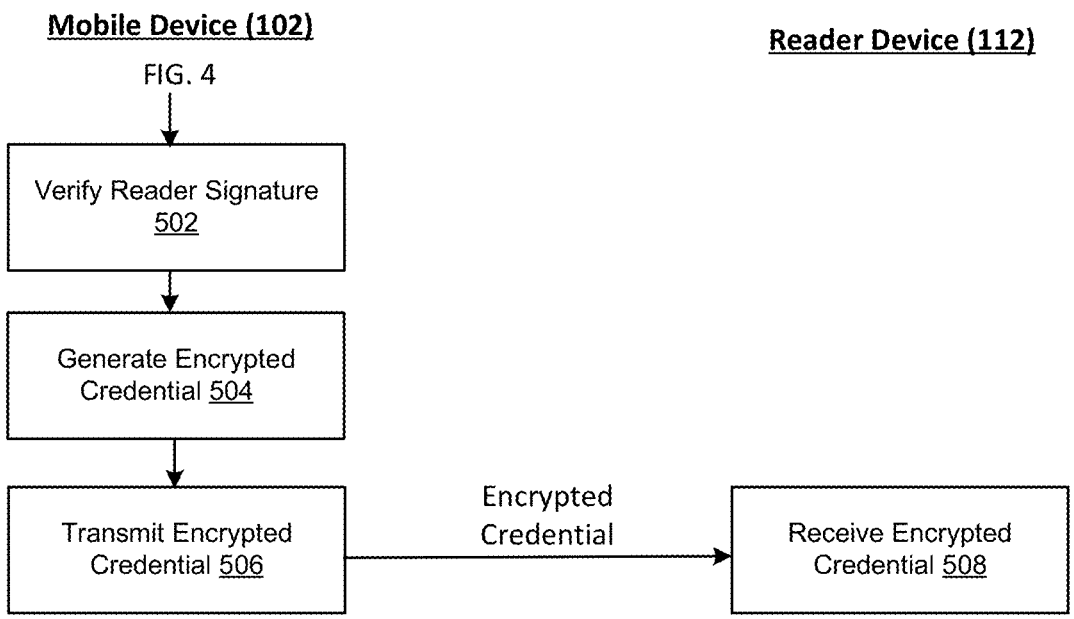
FIG. 5 illustrates a second communications process for techniques for authentication of a reader device.
Figure 6:
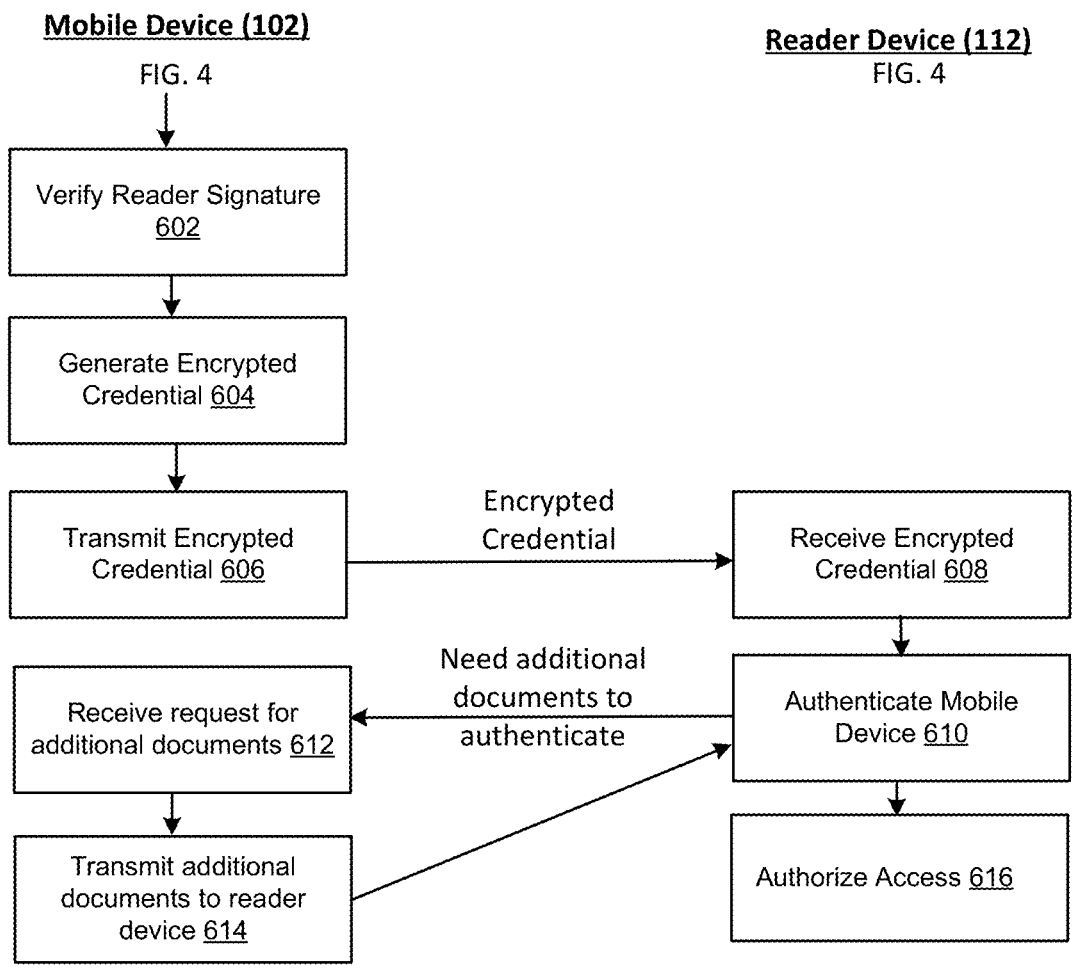
FIG. 6 illustrates a third communications process for techniques for authentication of a reader device.

The mobile device 102 can authenticate that the reader device 112 is authorized to receive the access credentials. The techniques described in FIG. 4 can be combined with techniques described in FIG. 5 or FIG. 6. In FIG. 5, following authentication of the reader device 112, the mobile device 102 transmits the secure credentials to the reader device 112. In FIG. 6, a process of mutual authentication is described. In the techniques described in FIG. 6, after authenticating the reader device 112, the reader device 112 can authenticate the mobile device 102.

A. Receiving a Reader Signature

In the first part of the technique, the mobile device can receive a signature that can be used to authenticate the reader device 116 prior to transmitting encrypted credentials for obtaining access.

Figure 4:
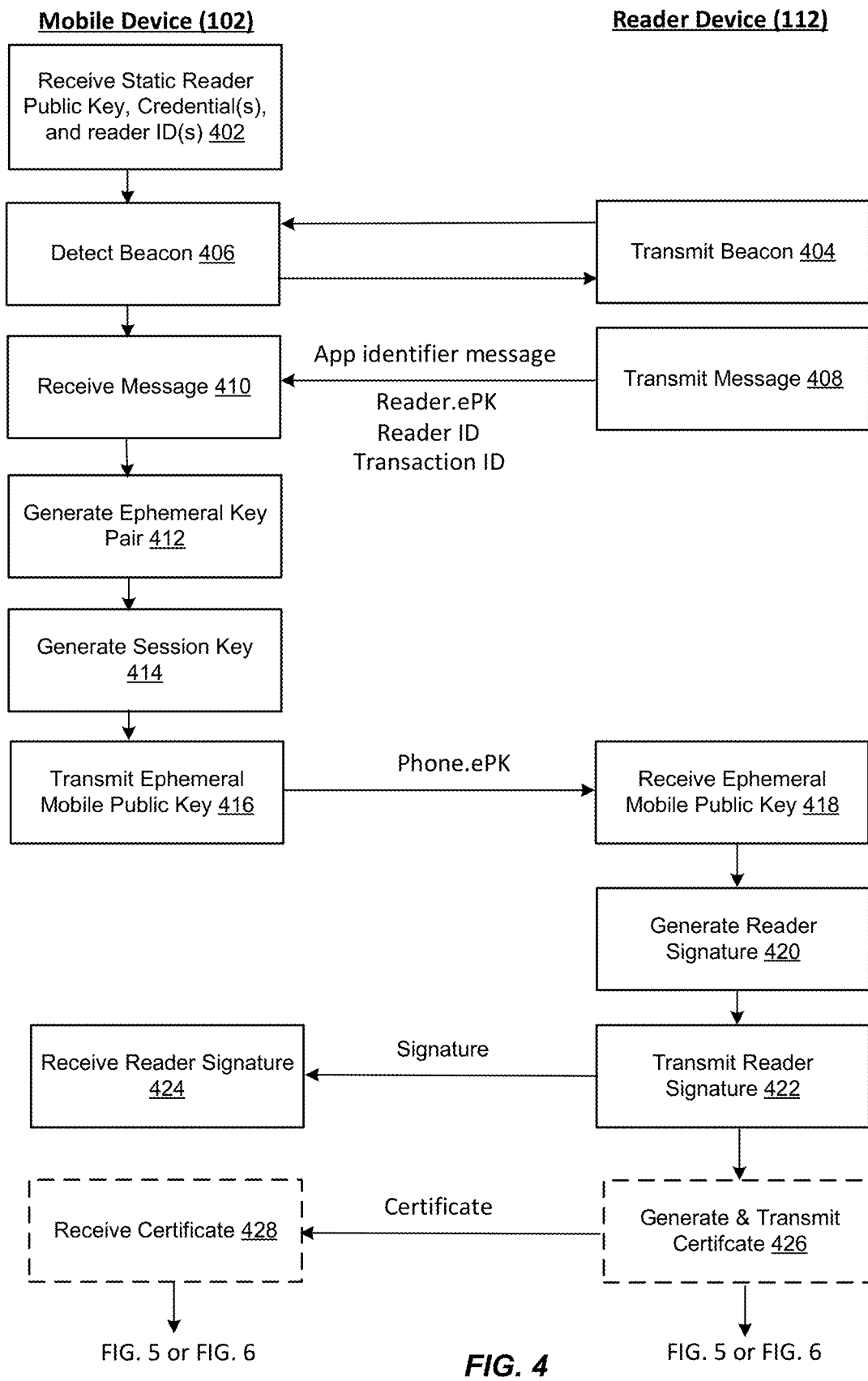
FIG. 4 illustrates a first communications process for techniques for authentication of a reader device.

FIG. 4 illustrates a communication diagram illustrating exemplary messages for techniques for authentication of the reader device according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

FIG. 4 involves the reader device 112 generating authentication material, sending the material to the mobile device 102 which authenticates the material, creates a private channel, and generates endpoint authentication material. The reader device 112 then authenticates the mobile device 102 and may create a secure channel. The authentication may be used to authorize one or more actions and the private and/or secure channels may be used to exchange various types of information. The disclosed techniques may allow authentication of the reader device 112 before the mobile device 102 provides any identifying information and may provide encryption for identifying information for mobile device 102 using the secure channel.

At 402, the mobile device 102 can receive a static public reader key and one or more credentials, and one or more reader identifiers associated with one or more reader device (s) 112 from a provisioning device 104. The one or more credentials may be access credentials that can be used to access one or more parts of a building. The mobile device 102 can be provisioned using the static public reader key for the reader device 112. The static public reader key and the one or more credentials can be provided by the provisioning device 112, which is a third device other than the reader device 112. The one or more reader identifiers can be used to cross-reference the static reader public keys with the one or more reader devices 112. In various embodiments, the mobile device 102 can download the static reader public key and the one or more credentials through a download at a secure website. In other embodiments, the static reader public key and the one or more credentials can be received by the mobile device 102 via an electronic message. The static public reader key can be stored in a memory of the mobile device 102.

In various embodiments, the static reader public key of the reader device is common to a plurality of reader devices. For example, all the electronic locks for exterior doors of a building may use the same static reader public key. In this way, after the mobile device 102 is provisioned with the static reader public key and the one or more credentials for the electronic locks for the exterior doors, the mobile device 102 can be used to unlock any of the doors without the mobile device 102 having to be provisioned for each exterior door. The one or more credentials can be stored in a memory of the mobile device 102.

At 404, the reader device 112 can transmit a beacon. The beacon can be transmitted using various protocols such as Bluetooth, Bluetooth Low Energy (BLE), or Near Field Communication (NFC). The beacon transmission can transmit identifying information of the reader device. In various embodiments, the reader device 112 can perform NFC anti-collision with enhanced contactless polling (although other techniques may be used in other embodiments).

At 406, the mobile device 102 can detect the beacon of the reader device 112. In various embodiments, the mobile device can prompt a user to select one or more applications (e.g., an electronic room access application). The mobile device 102 can send a wireless message to the reader to indicate that the mobile device 102 is ready to begin an authentication session. In various embodiments, the mobile device 102 can wake up on polling detection.

At 408, the reader device 112 can generate a message including an ephemeral reader public key, a reader identifier, and a transaction identifier. For example, the message may indicate an application identifier to select the appropriate application on the mobile device 102. The reader device 112 can generate a reader ephemeral key pair (e.g., reader.eSK and reader.ePK). The keys may be "ephemeral" in the sense that they are limited use, e.g., valid only for a certain number of uses (including embodiments in which they are valid for only a single use) or valid for a certain time interval. Ephemeral keys may be deleted at the end of each transaction. Because ephemeral keys are invalid after expiration, this may prevent the keys from being re-used by an unauthorized individual if they are somehow intercepted.

The ephemeral reader public key can be downloaded from a secure key server. The reader identifier can be a random number to uniquely identify the reader device 112. The transaction identifier can be a unique number to identify an access event between a mobile device 102 and the reader device 112.

The reader device 112 can transmit a wireless message to the mobile device 102. The wireless message can include the ephemeral reader public key, the reader identifier, and the transaction identifier. The message can be transmitted from the reader device 112 using various protocols such as Bluetooth, BLE, or NFC. In some embodiments, the transaction includes a SELECT command/response, an AUTH0 command/response, an AUTH1 command/response, and optionally one or more SET/GET command/responses.

In the message, the reader device 112 sends a command with transaction parameters. This may be referred to as an AUTH0 command, in some embodiments. In some embodiments, this command can include the reader ephemeral public key, the reader identifier, the transaction identifier. Therefore, the AUTH0 command may provide reader public information (static identifier and random session information) needed by the mobile device 102 to, if applicable, calculate a cryptogram based on the already established symmetric secret for the transaction.

At 410, the mobile device 102 can receive the wireless message sent from the reader device 112. The mobile device 102 can store the ephemeral reader public key, the reader identifier, and the transaction identifier in a memory of the mobile device 102.

At 412, the mobile device 102 can generate an ephemeral key pair that includes an ephemeral mobile private key and an ephemeral mobile public key (e.g., phone.eSK and phone.ePK). The ephemeral key pair can be stored in a memory of the mobile device 102.

At 414, the mobile device 102 can generate a session key using the ephemeral mobile private key and the ephemeral reader public key. The session key can be stored in a memory of the mobile device 102. In various embodiments, generating the session key uses an elliptic curve Diffie-Hellman function. Elliptic-curve Diffie-Hellman (ECDH) is a key agreement protocol that allows two parties, each having an elliptic-curve public—private key pair, to establish a shared secret over an insecure channel. This shared secret may be directly used as a key, or to derive another key. The key, or the derived key, can then be used to encrypt subsequent communications using a symmetric-key cipher. The public keys are either static (and trusted, say via a certificate) or ephemeral.

At 416, the mobile device 102 can transmit a random number as a challenge to the reader device 112. The random number can be the ephemeral mobile public key (e.g., phone.ePK) to the reader device 112. The ephemeral mobile public key can be transmitted from the mobile device 102 using various protocols such as Bluetooth, BLE, or NFC. This message including the ephemeral mobile public key can be known as the AUTH0 response.

At 418, the reader device 112 can receive the ephemeral mobile public key. The ephemeral mobile public key (e.g., phone.ePK) can be stored in a memory of the reader device 112.

At 420, the reader device 112 can generate a reader signature by signing a signature message using a static reader private key corresponding to the static reader public key. The signature message can be generated by the reader device. The signature message can include at least the endpoint ephemeral public key. In various embodiments, the signature message can include other items such as one or more of the reader identifier, the transaction identifier, and the reader ephemeral public key. The signature message can be stored in a memory of the reader device 112.

A digital signature is a mathematical scheme for verifying the authenticity of digital messages or documents. A valid digital signature, where the prerequisites are satisfied, gives a recipient very strong reason to believe that the message was created by a known sender (authentication), and that the message was not altered in transit (integrity).

A digital signature scheme typically consists of three algorithms, a key generation algorithm, a signing algorithm, and a signature verification algorithm. The key generation algorithm selects a private key uniformly at random from a set of possible private keys. The key generation algorithm outputs the private key and a corresponding public key. A signing algorithm that, given a message and a private key, produces a signature. A signature verifying algorithm that, given the message, the public key, and the signature, either accepts or rejects the message's claim to authenticity.

Two main properties can be required. First, the authenticity of a signature generated from a fixed message and fixed private key can be verified by using the corresponding public key. Secondly, it should be computationally infeasible to generate a valid signature for a party without knowing that party's private key. A digital signature is an authentication mechanism that enables the creator of the message to attach a code that acts as a signature. The Digital Signature Algorithm (DSA), developed by the National Institute of Standards and Technology, is one of many examples of a signing algorithm.

At 422, the reader device 112 can transmit the signature message to the mobile device 102. The signature message can be transmitted from the reader device 112 using various protocols such as Bluetooth, BLE, or NFC. This message may be referred to as an AUTH1 command. In some embodiments, the reader device 112 authenticates itself to the device in this message by sending the signature.

At 424, the mobile device 102 can receive the reader signature. The reader signature can be stored in a memory of the mobile device 102.

At 426, the mobile device 102 can access a reader certificate. In various embodiments, the reader certificate may not be required. The reader certificate can define access to one or more electronic systems. The reader certificate can contain the static public key of the reader that the reader device 112 used to create the signature message. The certificate can be verified with the static reader public key that has been previously stored on the mobile device 102. The certificate can be signed by the reader device 112 with its static private key, which can be verified by the static public key stored on the mobile device. Alternatively, the certificate can include the static public key of the reader device in case the mobile device 102 did not receive the static public key during provisioning as described above. In addition, the certificate can include information about the certificate authority to allow the mobile device 102 to verify the certificate over a network (e.g., the Internet). The reader device 112 can transmit the certificate to the mobile device 102 via wired or wireless communications.

At 428 the mobile device 102 can receive a certificate from the reader device 112. The certificate can be transmitted from the reader device 112 using various protocols such as Bluetooth, BLE, or NFC. The certificate can be stored in a memory of the mobile device. The mobile device 102 has the static public key of the reader device 116 and can use the reader identifier to verify the certificate from the reader device.

B. Verifying Reader Signature and Generating Encrypted Credential

Once the mobile device authenticates the reader device, the mobile device can send the credential to the reader device (e.g., when the reader device does not need to authenticate the mobile device) to obtain access. The authenticating of the reader device can protect against rogue or malicious terminal readers accessing the credentials from the mobile device.

FIG. 5 illustrates verifying the reader signature and transmitting an encrypted credential for access. In the techniques described by FIG. 5, only the reader device is authenticated.

At 502, the mobile device 102 can verify the reader signature using optionally the certificate, the static reader public key, and values for the ephemeral reader public key, the reader identifier, and the transaction identifier. If no certificate is received from the reader device 116, the mobile device can verify the signature for the reader device with the information it has received (e.g., the reader identifier).

At 504, the mobile device 102 can generate an encrypted credential by encrypting a first stored credential of the one or more access credentials using the session key as described above. The encrypted credential can include the reader identifier, the transaction identifier, and the ephemeral reader public key. The encrypted credential can be stored in a memory of the mobile device 102.

At 506, the mobile device 102 can transmit the encrypted credential (which may be referred to as an AUTH1 response) to the reader device 112 for providing access to the mobile device 102. For example, the mobile device 102 may send the encrypted response message to the reader device 112. The encrypted response can be transmitted to the reader device 112 using various protocols such as Bluetooth, BLE, or NFC. In various embodiments, the encrypted credential comprises the ephemeral public key of the mobile device 102.

At 508, the reader device 112 can receive the encrypted credential. The credential can be stored in a memory of the reader device 112. The reader device 112 can decrypt the encrypted credential from the mobile device 102. The reader device 112 can use the secure channel by generating its own session key from the reader ephemeral private key and the phone ephemeral public key. The reader device 112 can provide access upon receipt of the encrypted credential. The reader device 112 can then decrypt the credential and then match against a stored credential expected for any device to gain access to the area controlled by the reader device 112. The encrypted credential can be various things. For example, the encrypted credential can be a signature using a private key to which the reader device has a corresponding public key, which has been provisioned to the reader device to identify which mobile device have access.

C. Process for Verifying Reader Signature, Authenticating Mobile Device Prior to Generating Encrypted Credential In cases requiring mutual authentication, the mobile device can authenticate the reader device, and the reader device can authenticate the mobile device. For example, after authentication of the reader device, the reader device can authenticate the mobile device prior to sending the credentials to the reader device to obtain access. The authenticating of the reader device can protect against rogue or malicious terminal readers accessing the credentials from the mobile device. Authenticating the mobile device can help protect against unauthorized mobile devices that have obtained the one or more credentials.

FIG. 6 illustrates a technique for mutual authentication of both the reader device 116 and the mobile device 102.

At 602, the mobile device 102 can verify the reader signature in a similar manner as described at block 502.

At 604, the mobile device 102 can generate an encrypted credential by encrypting a first stored credential of the one or more access credentials using the session key as described above. The encrypted credential can include the reader identifier, the transaction identifier, and the ephemeral reader public key. The encrypted credential can be stored in a memory of the mobile device 102.

At 606, the mobile device 102 can transmit the encrypted credential (which may be referred to as an AUTH1 response) to the reader device 112 for providing access to the mobile device 102. For example, the mobile device 102 may send the encrypted response message to the reader device 112. The encrypted response can be transmitted to the reader device 112 using various protocols such as Bluetooth, BLE, or NFC. In various embodiments, the encrypted credential comprises the ephemeral public key of the mobile device 102.

At 608, the reader device 112 can receive the encrypted credential. The credential can include mobile device signature and the identifier of the static reader public key used to verify the signature. The credential can be stored in a memory of the reader device 112. The reader device 112 can decrypt the encrypted credential from the mobile device 102. The reader device 112 can either access a cached document or is able a retrieve from a server the static public key corresponding to the reader identifier. The cached documents can be from a previous interaction between the mobile device 102 and the reader device 112 that have been stored in a memory of the mobile device 102. The reader device 112 can verify the signature on the encrypted credential and provide access or not depending on the verification. The reader device 112 can determine that it does not have any documents stored corresponding to the reader identifier and it cannot download any documents because the reader device 112 is off-line. In this process, the reader device can request additional documents from the mobile device 102.

The credential can also be a code provisioned on the reader device 112. In this case, the reader device 112 can decrypt the code and compare the decrypted code with the code stored on the reader device 112 was expecting from the mobile device 102. In this case, the mobile device 102 may not be authenticated. In various embodiments, the code can be a shared secret. The reader device 112 would be provisioned with the public key from the mobile device 102. The facility manager would provision the reader device 112 with the public key from the mobile device 102. Alternatively, if the reader device 112 is offline, additional documents can be requested by the reader device 112.

In various embodiments, the mobile device 102 can send the signature related to the root public key which can be sent to the reader device 112 without being requested.

The reader device 112 can use the secure channel by generating its own session key from the reader ephemeral private key and the phone ephemeral public key. The reader device 112 can provide access upon receipt of the encrypted credential. The reader device 112 can then decrypt the credential and then match against a stored credential expected for any device to gain access to the area controlled by the reader device 112.

At 610, the reader device 112 can authenticate the mobile device 102 using the encrypted response message including the reader identifier, the transaction identifier, and the ephemeral reader public key. In various embodiments, the reader device 112 can authenticate the mobile device 102 by validating the transaction identifier. In various embodiments, the reader device 112 can connect with a network (e.g., the Internet) and a server to validate the signature from the mobile device 102. In various embodiments, the reader device can access a server using an identifier of the public key that made the signature. The reader can download and verify the static public key associated with the identifier to authenticate the mobile device.

In a step-up mode, the reader device 112 is off-line and not connected on-line to a network or a server. The reader device 112 can request security documents from the mobile device 102. The reader device 112 can send a message to the mobile device with this request.

At 612, the mobile device can receive a request for security documents. The security documents can include a root public key and a signature from an access control authority that the reader device 112 should trust. For off-line reader, the root public key can be pre-stored in the reader to allow verification of documents issued by the corresponding authority.

At 614, the mobile device 102 can transmit the security documents to the reader device 112. The reader device 112 can verify the security document using a secure element in its memory. The reader device 112 can extract the public key from the security documents and verify the encrypted credential received from the mobile device 102.

The reader device 112 can be configured with a root public key that can verify the authenticity of the documents. The documents received from the mobile device 102 can contain a signature that can be authenticated against the root public key that is stored on the reader device 112.

The mobile device 102 is provided the root public key from the access manager at the facility (e.g., the hotel). The mobile device public key can be present in a document signed by the access manager. The reader device 112 can be able to verify the document using the access manager root public key which can be pre-stored in the reader device 112, then the reader device 112 can extract the mobile device public present in the document and use it to verify the mobile device signature.

For example, a hotel guest can use an App for the facility (e.g., the hotel) to check in the hotel and requesting an electronic key. Using the secure element of the mobile device 102 a transient key pair (transient private key and transient public key) can be generated. The transient private key can be maintained confidential in the secure element of the mobile device 102. The public key can be sent to the facility (e.g., the hotel). The facility manager can create a document that contains the public key of the mobile device 102 and access rights (e.g., access rights to a specific room). The facility manager will sign the document with a root private key; the corresponding root public key can be provisioned to all the reader devices 112 of the facility. The facility manager can send the signed document to the mobile device 102. The mobile device 102 can then access a reader device 112 in the facility and submit the documents. The reader device 112 can verify the documents (which may be encrypted using a session key) using the root public key, which is provisioned by the access manager/hotel. The reader device 112 can extract from these documents the public key that allows the reader device 112 to verify the signature, calculated using a private key stored in the secure element of the specific mobile device 102.

At 616, the reader device can send a signal to an electronic lock allowing access.

Although FIGS. 4, 5, and 6 shows example blocks of processes 400, 500, and 600, in some implementations, processes 400, 500, and 600 may include additional blocks, fewer blocks, different blocks, or differently arranged blocks than those depicted in FIGS. 4, 5 and 6. Additionally, or alternatively, two or more of the blocks of processes 400, 500, and 600 may be performed in parallel.

D. Flow for Authenticating Reader Devices.

The mobile device can authenticate a reader device prior to sending the credential for access. In various embodiments, the reader device can also authenticate the mobile device prior to receiving the secure credentials.

Figure 7:
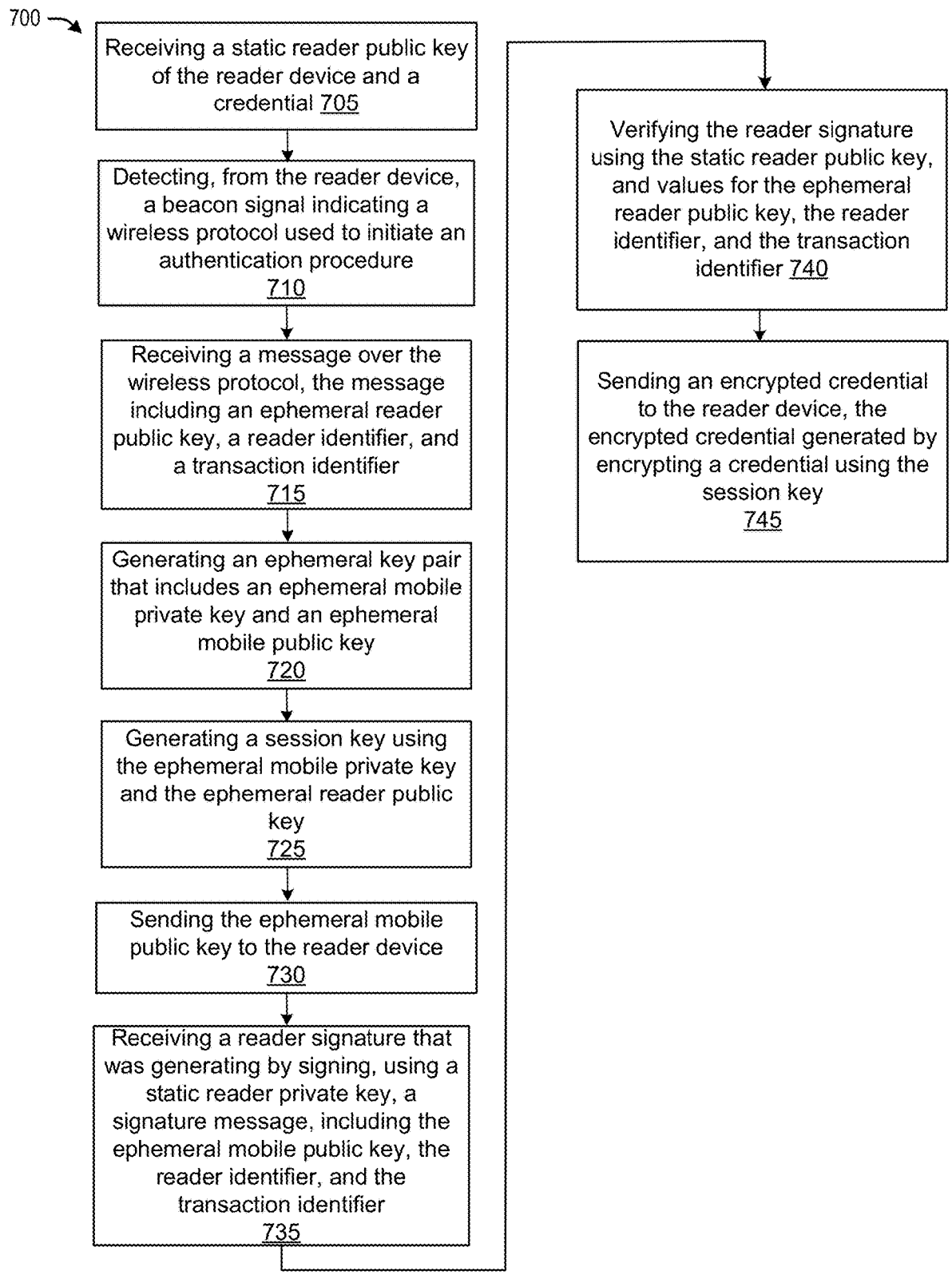
FIG. 7 illustrates a flow diagram for techniques for authentication of a reader device.

FIG. 7 is a flowchart of an example process 700 associated with techniques for authenticating a reader device for a building. In some implementations, one or more process blocks of FIG. 7 may be performed by a mobile device 102 (e.g., mobile device 1000). In some implementations, one or more process blocks of FIG. 7 may be performed by another device or a group of devices separate from or including the mobile device. Additionally, or alternatively, one or more process blocks of FIG. 7 may be performed by one or more components of device 1000, such as control circuitry 1004, computer readable medium 1002, input/output subsystem 1006, wireless circuitry 1008, and/or communication module 1024.

At 705, process 700 may include receiving, from a provisioning device, a static reader public key of the reader device, a credential to access one or more parts of a building, and a reader identifier. The credential can specify which parts of the building the mobile device user is authorized access to. The credential can include a mobile device signature and the identifier of the static reader public key used to verify the signature. For example, one credential can provide access to a room or multiple rooms and one credential can provide access to fitness facilities (e.g., a gym). Another credential can provide access to and from the parking facilities. Another credential can provide access to a business center. Another credential can provide access to dining facilities. Another credential can provide access to a mini-bar or concessions in the hotel. The process 700 can include storing a static reader public key of the reader device. In various embodiments, the static reader public key of the reader device is common to a plurality of reader devices. In various embodiments, process 700 includes receiving, via a network, the static reader public key from, and storing the static reader public key in a memory of the mobile device. In various embodiments, the static reader public key can be downloaded from a secure website (e.g., a hotel website).

In various embodiments, the process 700 can include receiving, from the provisioning device, the reader identifier for the reader device. The process 700 can include storing the received reader identifier in associated with the static reader public key and the first access credential. The process 700 can include selecting the first access credential of the one or more access credentials by matching the reader identifier from the reader device with the stored reader identifier.

In various embodiments, the process 700 can include storing a plurality of access credentials for different reader devices. The selection of the first access credential can be from the plurality of access credentials, each of which are stored in association with a different reader identifier.

In various embodiments, the process can include selecting the first access credential of the one or more access credentials by matching the reader identifier from the reader device with the stored reader identifier.

At 710, process 700 may include detecting, from the reader device, a beacon signal indicating a wireless protocol used to initiate an authentication procedure. For example, the mobile device may detect, from the reader device, a beacon signal indicating a wireless protocol used to initiate an authentication procedure, as described above. The beacon can be transmitted using various protocols such as Bluetooth, BLE, or NFC. If the beacon is NFC, in order for the mobile device to detect the beacon signal the mobile device needs to be within communication range of the wireless protocol. The communication range of NFC is roughly 10 centimeters. However, an antenna may be used to extend the range up to 20 centimeters. This short range is intentional, as it provides security by only allowing devices to communicate within close-proximity of each other.

At 715, process 700 may include receiving a message over the wireless protocol, the message including an ephemeral reader public key, a reader identifier, and a transaction identifier. For example, the mobile device may receive a message over the wireless protocol, the message including an ephemeral reader public key, a reader identifier, and a transaction identifier, as described above. The message can be transmitted from the reader device using various protocols such as Bluetooth, BLE, or NFC.

At 720, process 700 may include generating an ephemeral key pair that includes an ephemeral mobile private key and an ephemeral mobile public key. For example, the mobile device may generate an ephemeral key pair that includes an ephemeral mobile private key and an ephemeral mobile public key, as described above.

At 725, process 700 may include generating a session key using the ephemeral mobile private key and the ephemeral reader public key. For example, the mobile device may generate a session key using the ephemeral mobile private key and the ephemeral reader public key, as described above. In various embodiments, the generating the session key uses an elliptic curve Diffie-Hellman function. Elliptic-curve Diffie-Hellman (ECDH) is a key agreement protocol that allows two parties, each having an elliptic-curve public—private key pair, to establish a shared secret over an insecure channel. This shared secret may be directly used as a key, or to derive another key. The key, or the derived key, can then be used to encrypt subsequent communications using a symmetric-key cipher. The public keys are either static (and trusted, say via a certificate) or ephemeral. Ephemeral keys are temporary and not necessarily authenticated so if authentication is desired; authenticity assurances must be obtained by other means.

At 730, process 700 may include sending the ephemeral mobile public key to the reader device. For example, the mobile device may send the ephemeral mobile public key to the reader device, as described above. The ephemeral mobile public key can be transmitted from the reader device using various protocols such as Bluetooth, BLE, or NFC.

At 735, process 700 may include receiving a reader signature that was generating by signing, using a static reader private key, a signature message, including the ephemeral mobile public key, the reader identifier, and the transaction identifier. For example, the mobile device may receive a reader signature that was generating by signing, using a static reader private key, a signature message, including the ephemeral mobile public key, the reader identifier, and the transaction identifier, as described above. The signature message can be stored in a memory of the mobile device.

In various embodiments, process 700 may optionally include receiving a certificate from the reader device, e.g., for further authentication using a certificate authority. For example, the mobile device may receive a certificate from the reader device and verify the certificate with a certificate authority, as described above. The certificate can be transmitted from the reader device using various protocols such as Bluetooth, BLE, or NFC. The certificate can be stored in a memory of the mobile device. The certificate can be used for chain verification.

At 740, process 700 may include verifying the reader signature using the static reader public key, and values for the ephemeral reader public key, the reader identifier, and the transaction identifier. For example, the mobile device can use the static reader public key to decrypt the reader signature to obtain a signature message, which can be compared to a generated signature message using the already obtained values for the ephemeral reader public key, the reader identifier, and the transaction identifier, as described above. If available, the mobile device can also use a certificate received from the reader device.

At 745, process 700 may include sending an encrypted credential to the reader device, the encrypted credential generated by encrypting a first access credential using the session key. The encrypted response can be transmitted to the reader device using various protocols such as Bluetooth, BLE, or NFC. In various embodiments, the encrypted response message comprises the ephemeral public key of the mobile device. In various embodiments, the reader device sends a signal to the electronic lock upon receiving the encrypted credential.

In various embodiments, the process 700 can include determining a credential of the one or more access credentials that corresponds to the reader device. As multiple static reader public keys can be stored on the mobile device, the mobile device will need to determine which specific credential is used for a specific reader device. In various embodiments, the reader identifier can be used to cross-reference the credential with its associated reader device. In this way, the proper credential can be selected for encryption. In various embodiments, the one or more access credentials comprise secure information for access to at least one of a room, an elevator, a parking garage, a fitness center, and a business center. In various embodiments, the static reader public key of the reader device is common to a plurality of reader devices.

In various embodiments, if the reader device fails to verify the encrypted credential, the process 700 can include receiving a request message for additional security documents from the mobile device. The process 700 can include sending the security documents to the reader device for authenticating the mobile device. Upon authenticating the mobile device, access can be granted.

Process 700 may include additional implementations, such as any single implementation or any combination of implementations described below and/or in connection with one or more other processes described elsewhere herein.

In various embodiments, process 700 includes providing an indication on the display of the mobile device that the authentication is complete.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

V. Exemplary Reader Device

The reader device can be an electronic device configured to communicate with the mobile device 102 to receive a credential, secure data, and/or any other useful information for processing. The reader device can be part of system for access control, transit, vending, or other applications of interest. The reader device can be integrated into or used in association with an electronic lock assembly. The reader device can include a transceiver that allows the mobile device and the reader device to communicate with one another, preferably wirelessly. In some embodiments, the transceiver is a Bluetooth transceiver that allows the mobile device and the reader device to communicate via a Bluetooth connection. It is also contemplated that the Bluetooth connection is a BLE connection. In various embodiments, the reader device can communicate using NFC protocol or Wi-Fi protocol. The receiver device can include a processor and a memory to store the various secure elements (e.g., the static reader public key, the static reader private key, and ephemeral public/private key for the reader device). The reader device can be identified by an identifier.

Figure 8:
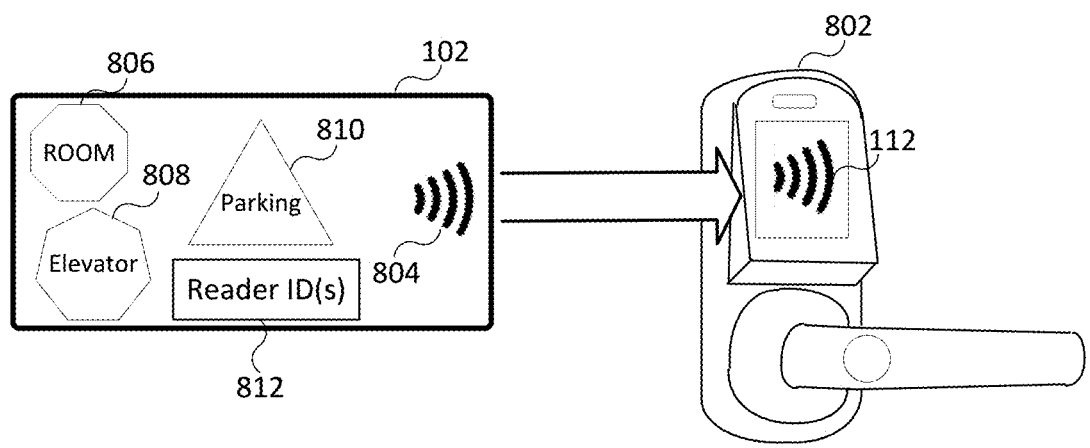
FIG. 8 illustrates an exemplary system for authenticating a reader device using a mobile device.

FIG. 8 illustrates an exemplary system for authenticating a reader device using a mobile device. FIG. 8 illustrates a reader device 112 for an electronic lock 802. The reader device 112 can send one or more electrical signals to an actuator, not shown, to lock or unlock the electronic lock 802. In various embodiments, the reader device 112 can receive one or more electronic signals via a wireless protocol (e.g., NFC, Bluetooth, BLE, or Wi-Fi) from a mobile device 102. The mobile device can include a wireless transceiver with one or more antennas 804 that are capable of sending and/or receiving wireless signals over a wireless protocol. The mobile device 102 can store one or more credentials for activating an electronic lock 802. The one or more credentials can include a credential for a specific room 806, a credential for an elevator 808, and a credential for parking 810. Other credentials can be stored (e.g., other room credentials, fitness center credentials, dining facility credentials, business center credentials and/or in room bar/concessions credentials). The mobile device 102 can store one or more reader identifiers 812 for the reader devices that can be used for determining which credential belongs to which reader device.

After authentication of the mobile device 102 and the reader device 112, the mobile device 102 can wirelessly transmit the credential from the mobile device 102 to the reader device 112. Upon receipt of the credentials from an authorized device, the reader device 112 can generate a signal to active an electrical lock to permit access.

VI. Example Mobile Device

Figure 9:
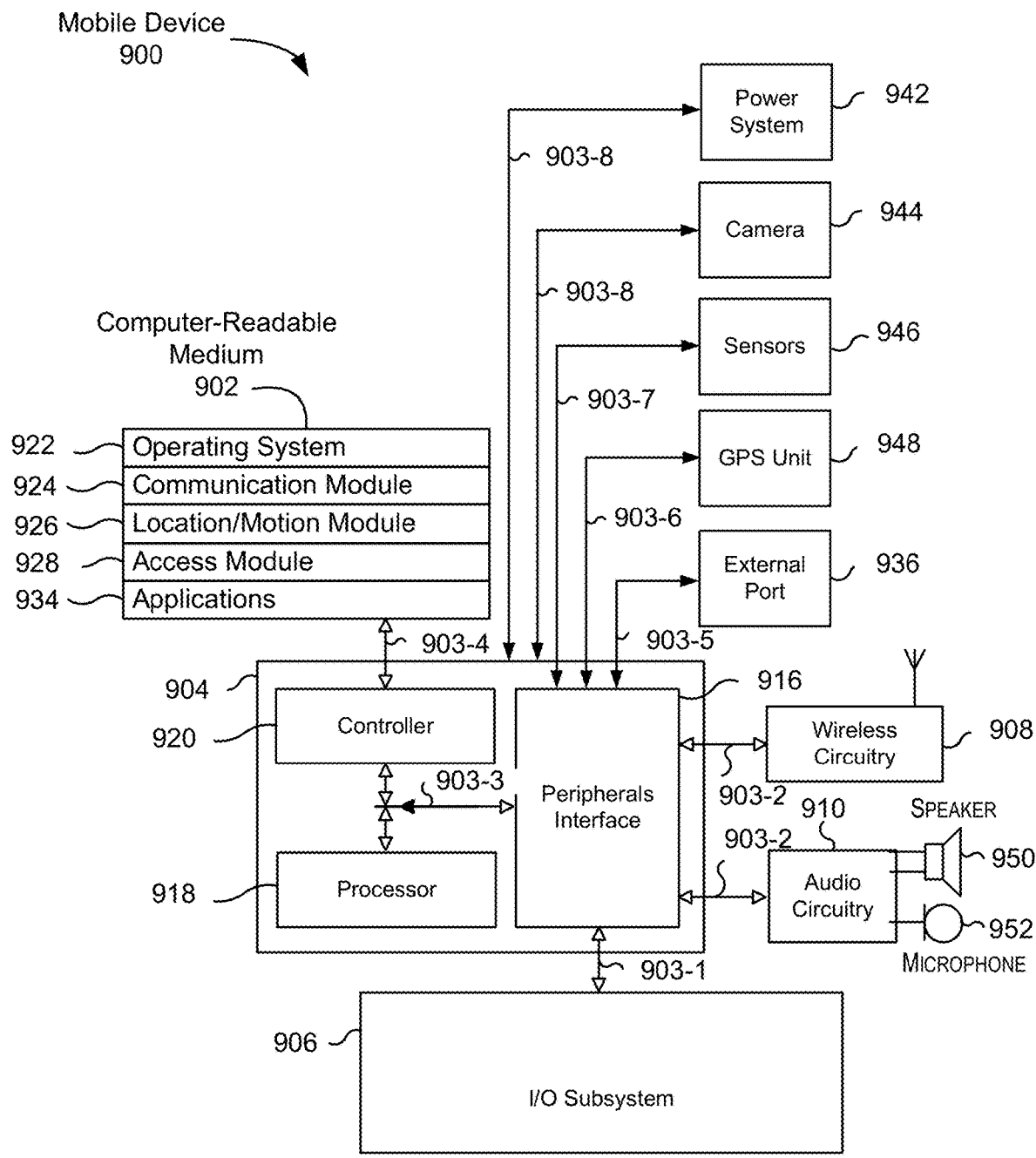
FIG. 9 is block diagram of an example device according to embodiments of the present disclosure.

FIG. 9 is a block diagram of an example mobile device 900. Device 900 generally includes computer-readable medium 902, control circuitry 904, an Input/output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to control circuitry 904 via peripherals interface 916. Peripherals interface 916 can include conventional components for establishing and maintaining communication between peripherals and. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 916, one or more processors 918, and controller 920 can be implemented on a single chip, such as control circuitry 904. In some other embodiments, they can be implemented on separate chips.

Processor(s) 918 can include hardware and/or software elements that perform one or more processing functions, such as mathematical operations, logical operations, data manipulation operations, data transfer operations, controlling the reception of user input, controlling output of information to users, or the like. Processor(s) 918 can be embodied as one or more hardware processors, microprocessors, microcontrollers; field programmable gate arrays (FPGAs), application-specified integrated circuits (ASICs), or the like.

Device 900 may include storage and processing circuitry such as control circuitry 904. Control circuitry 904 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 904 may be used to control the operation of device 900. This processing circuitry may be based on one or more microprocessors, microcontrollers, digital signal processors, baseband processor integrated circuits, application specific integrated circuits, etc.

Control circuitry 904 may be used to run software on device 900, such as internet browsing applications, voice-over-internet-protocol (VOIP) telephone call applications, email applications, media playback applications, operating system functions, etc. To support interactions with external equipment, control circuitry 904 may be used in implementing communications protocols. Communications protocols that may be implemented using control circuitry 904 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 900 may include input/output subsystem 906. Input/output subsystem 906 may include input-output devices. Input/output devices may be used to allow data to be supplied to device 900 and to allow data to be provided from device 900 to external devices. Input/output devices may include user interface devices, data port devices, and other input-output components. For example, input/output devices may include one or more displays (e.g., touch screens or displays without touch sensor capabilities), one or more image sensors 944 (e.g., digital image sensors), motion sensors, and speakers 950. Input-output device may also include buttons, joysticks, scrolling wheels, touch pads, keypads, keyboards, microphones 952, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes an image sensor 944 (e.g., a camera). In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a Global Positioning System (GPS) receiver, sometimes referred to as a GPS unit 948. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module 924 (or set of instructions), a location module 926 (or set of instructions), a access module 928 that is used as part of authentication operations described herein, and other application programs 934 (or set of instructions).

Operating system 922 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 926 can assist in determining the current position (e.g., coordinates or other geographic location identifiers) and motion of device 900. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Access module 928 can send/receive ranging messages to/from an antenna, e.g., connected to wireless circuitry 908. The access module 928 can generate secure components (e.g., public/private keys), send, and receive various messages through a wireless circuitry (e.g., NFC protocol). The various messages can determine if a reader device is authorized to receive the secure credentials stored in the computer readable medium 902 of the mobile device 900. The access module 928 can manage one or more stored static public reader static keys, one or more credentials, and one or more reader identifiers. The access module 928 can determine which credential is associated with which reader device based at least in part on the reader identifiers.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 900 (e.g., portions of the display cover layer, portions of a plastic antenna window in a metal housing sidewall portion of housing, etc.). With one illustrative configuration, some or all of rear face of device 900 may be formed from a dielectric. For example, the rear wall of housing may be formed from glass plastic, ceramic, other dielectric. In this type of arrangement, antennas may be mounted within the interior of device 900 in a location that allows the antennas to transmit and receive antenna signals through the rear wall of device 900 (and, if desired, through optional dielectric sidewall portions in housing). Antennas may also be formed from metal sidewall structures in housing and may be located in peripheral portions of device 900.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 900 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 900

(e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 900. As an example, antennas may be mounted at one or both ends of device 900 (e.g., along the upper and lower edges of housing, at the corners of housing, etc.).

Antennas in device 900 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 11 GHz and 400 GHz.

Wireless circuitry in device 900 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 944 may include one or more visible digital image sensors (visible-light cameras) and/or one or more infrared digital image sensors (infrared-light cameras). Image sensors 944 may, if desired, be used to measure distances. For example, an infrared time-of-flight image sensor may be used to measure the time that it takes for an infrared light pulse to reflect-back from objects in the vicinity of device 900, which may in turn be used to determine the distance to those objects. Visible imaging systems such as a front and/or rear-facing camera in device 900 may also be used to determine the position of objects in the environment. For example, control circuitry 904 may use image sensors 944 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 904 may rely entirely upon image sensors 944 to perform simultaneous localization and mapping, or control circuitry 904 may synthesize image data with range data from one or more distance sensors (e.g., light-based proximity sensors). If desired, control circuitry 904 may use display to display a visual representation of the mapped environment.

Input-output devices may include motion sensor circuitry 946. Motion sensor circuitry 946 may include one or more accelerometers (e.g., accelerometers that measure acceleration along one, two, or three axes), gyroscopes, barometers, magnetic sensors (e.g., compasses), image sensors (e.g., image sensor 944) and other sensor structures. Sensors 946 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 904 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 904. Movement generation circuitry may include electromechanical actuator circuitry that, when driven, moves device 900 in one or more directions. For example, movement generation circuitry may laterally move device 900 and/or may rotate device 900 around one or more axes of rotation. Movement generation circuitry may, for example, include one or more actuators formed at one or more locations of device 900. When driven by a motion control signal, actuators may move (e.g., vibrate, pulse, tilt, push, pull, rotate, etc.) to cause device 900 to move or rotate in one or more directions. The movement may be slight (e.g., not noticeable or barely noticeable to a user of device 900), or the movement may be substantial. Actuators may be based on one or more vibrators, motors, solenoids, piezoelectric actuators, speaker coils, or any other desired device capable of mechanically (physically) moving device 900.

Some or all of movement generation circuitry such as actuators may be used to perform operations that are unrelated to rotation of device 900. For example, actuators may include vibrators that are actuated to issue a haptic alert or notification to a user of device 900. Such alerts may include, for example, a received text message alert identifying that device 900 has received a text message, a received telephone call alert, a received email alert, an alarm notification alert, a calendar notification alert, or any other desired notification. By actuating actuator, device 900 may inform the user of any desired device condition.

Motion sensor circuitry may sense motion of device 900 that is generated by movement generation circuitry. If desired, motion sensor circuitry may provide feedback signals associated with the sensed motion of device 900 to movement generation circuitry. Movement generation circuitry may use the feedback signals to control actuation of the movement generation circuitry.

Control circuitry 904 may use motion sensor circuitry and/or movement generation circuitry to determine the angle of arrival of wireless signals received by device 900 from another electronic device. For example, control circuitry 904 may use movement generation circuitry to move device 900 from one position to another. Motion sensor circuitry may be used to track the movement of device 900 as it is moved between the different positions. At each position, control circuitry 904 may receive wireless signals from another electronic device. Control circuitry 904 may process the received wireless signals together with the motion data from motion sensor circuitry to more accurately determine the position of the other electronic device. The use of motion generation circuitry is merely illustrative, however. If desired, motion sensor circuitry may track movement of device 900 that is not caused by motion generation circuitry. This may include a user's natural, unprompted movement of device 900 and/or the user's movement of device 900 after the user is prompted (by display, audio circuitry 910, a haptic output device in device 900, or any other suitable output device) to move device 900 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 908 may include radio-frequency transceiver circuitry for handling various radio-frequency communications bands. For example, wireless circuitry 908 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 900 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 934 on device 900 can include any applications installed on the device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use light emitting diode (LED), liquid crystal display (LCD) technology, or light emitting polymer display (LPD) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device 900 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve provisioning applets on users' devices. The present disclosure contemplates that in some instances, this gathered data may include personal information data that uniquely identifies or can be used to contact or locate a specific person. Such personal information data can include demographic data, location-based data, online identifiers, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, applets can be selected and provisioned to users' devices based on aggregated non-personal information data or a bare minimum amount of personal information, such as the content being handled only on the user's device or other non-personal information available to the applet provisioning services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as random-access memory (RAM), dynamic random-access memory (DRAM), static random-access memory (SRAM), Thyristor random-access memory (T-RAM), Z-RAM, and twin-transistor random-access memory (TTRAM). The computer-readable medium also can include any non-volatile semiconductor memory, such as read only memory (ROM), programmable read only memory (PROM), erasable programmable read only memory (EPROM), electronically erasable programmable read only memory (EEPROM), non-volatile random access memory (NVRAM), flash, non-volatile static random access memory (nvSRAM), ferroelectric random-access memory (FeRAM), ferroelectric-transistor random-access memory (FeTRAM), magnetoresistive random-access memory (MRAM), programmable random access memory (PRAM), conductive bridging random-access memory (CBRAM), silicon-oxide-nitride-oxide-silicon (SONOS), resistive random-access memory (RRAIVI), nano random-access memory (NRAM), racetrack memory, Floating Junction Gate Random Access Memory (FJG), and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. A method for performing an authentication between a first application running on a mobile device and a reader device, the method comprising performing, by the first application running on the mobile device:
   receiving a static reader public key of the reader device and one or more access credentials to access one or more parts of a hotel;
   receiving, from the reader device, a message including an ephemeral reader public key, a reader identifier for the reader device, and a transaction identifier;
   receiving a reader signature that was generated by signing, using a static reader private key corresponding to the static reader public key, a signature message, including the reader identifier and the transaction identifier;
   verifying the reader signature using the static reader public key and values for the reader identifier and the transaction identifier; and
   sending an encrypted credential to the reader device, the encrypted credential generated by encrypting a first access credential of the one or more access credentials using a session key, wherein the session key is generated using an ephemeral mobile private key and the ephemeral reader public key.

2. The method of claim 1, wherein the one or more access credentials comprise secure information configurable, using a provisioning device, for access to at least one of a room, an elevator, a parking garage, a fitness center, and a business center.

3. The method of claim 1, further comprising:
   receiving, from the reader device in response to a verification failure, a request message for additional security documents from the mobile device; and
   sending, in response to the request message, the additional security documents to the reader device for authenticating the mobile device.

4. The method of claim 3, wherein the additional security documents include a root public key and a signature from an access control authority for authenticating the mobile device.

5. The method of claim 1, further comprising:
generating an ephemeral key pair that includes an ephemeral mobile private key and an ephemeral mobile public key, wherein the signature message includes the ephemeral mobile public key.

6. The method of claim 5, wherein the session key is generated based on an elliptic curve Diffie-Hellman function.

7. The method of claim 1, further comprising:
receiving the reader identifier from a provisioning device; and
storing the reader identifier in association with the static reader public key and the first access credential.

8. A non-transitory machine-readable medium storing instructions to cause one or more processors of an electronic device to perform operations comprising:
receiving a static reader public key of a reader device and one or more access credentials to access one or more parts of a hotel;
receiving, from the reader device, a message including an ephemeral reader public key, a reader identifier for the reader device, and a transaction identifier;
receiving a reader signature that was generated by signing, using a static reader private key corresponding to the static reader public key, a signature message, including the reader identifier and the transaction identifier;
verifying the reader signature using the static reader public key and values for the reader identifier and the transaction identifier; and
sending an encrypted credential to the reader device, the encrypted credential generated by encrypting a first access credential of the one or more access credentials using a session key, wherein the session key is generated using an ephemeral mobile private key and the ephemeral reader public key.

9. The non-transitory machine-readable medium of claim 8, wherein the one or more access credentials comprise secure information configurable, using a provisioning device, for access to at least one of a room, an elevator, a parking garage, a fitness center, and a business center.

10. The non-transitory machine-readable medium of claim 8, the operations additionally comprising:
receiving, from the reader device in response to a verification failure, a request message for additional security documents; and
sending, in response to the request message, the additional security documents to the reader device.

11. The non-transitory machine-readable medium of claim 10, wherein the additional security documents include a root public key and a signature from an access control authority.

12. The non-transitory machine-readable medium of claim 8, the operations additionally comprising:
generating an ephemeral key pair that includes an ephemeral mobile private key and an ephemeral mobile public key, wherein the signature message includes the ephemeral mobile public key.

13. The non-transitory machine-readable medium of claim 8, the operations additionally comprising:
receiving the reader identifier from a provisioning device; and
storing the reader identifier in association with the static reader public key and the first access credential.

14. An electronic device comprising:
a memory; and
one or more processors communicatively coupled to the memory and configured to execute instructions stored in the memory for performing operations of:
receiving a static reader public key of a reader device and one or more access credentials to access one or more parts of a hotel;
receiving, from the reader device, a message including an ephemeral reader public key, a reader identifier for the reader device, and a transaction identifier;
receiving a reader signature that was generated by signing, using a static reader private key corresponding to the static reader public key, a signature message, including the reader identifier and the transaction identifier;
verifying the reader signature using the static reader public key and values for the reader identifier and the transaction identifier; and
sending an encrypted credential to the reader device, the encrypted credential generated by encrypting a first access credential of the one or more access credentials using a session key, wherein the session key is generated using an ephemeral mobile private key and the ephemeral reader public key.

15. The electronic device of claim 14, wherein the one or more access credentials comprise secure information configurable, using a provisioning device, for access to at least one of a room, an elevator, a parking garage, a fitness center, and a business center.

16. The electronic device of claim 14, wherein the one or more processors are configured to execute instructions for performing operations of:
receiving, from the reader device in response to a verification failure, a request message for additional security documents; and
sending, in response to the request message, the additional security documents to the reader device.

17. The electronic device of claim 16, wherein the additional security documents include a root public key and a signature from an access control authority.

18. The electronic device of claim 14, wherein the one or more processors are configured to execute instructions for performing operations of:
generating an ephemeral key pair that includes an ephemeral mobile private key and an ephemeral mobile public key, wherein the signature message includes the ephemeral mobile public key.

19. The electronic device of claim 18, wherein the session key is generated based on an elliptic curve Diffie-Hellman function.

20. The electronic device of claim 14, wherein the one or more processors are configured to execute instructions for performing operations of:
receiving the reader identifier from a provisioning device; and
storing the reader identifier in association with the static reader public key and the first access credential.

* * * * *